United States Patent [19]

Yoshino

[11] 3,969,642

[45] July 13, 1976

[54] STEP MOTOR FOR ELECTRONIC TIMEPIECE

[75] Inventor: Masahito Yoshino, Suwa, Japan

[73] Assignee: Kabushiki Kaisha Suwa Seikosha, Tokyo, Japan

[22] Filed: July 17, 1974

[21] Appl. No.: 489,323

[30] Foreign Application Priority Data

July 17, 1973 Japan ................................ 48-79835

[52] U.S. Cl. ................................ 310/49 R; 58/23 D

[51] Int. Cl.$^2$ ........................................ H02K 37/00

[58] Field of Search ................. 310/49, 68, 83, 156, 310/162, 163, 164, 71, 40 MM; 58/23 D

[56] References Cited

UNITED STATES PATENTS

| | | | |
|---|---|---|---|
| 2,457,637 | 12/1948 | Brailsford | 310/40 MM |
| 2,601,517 | 6/1952 | Hammes | 310/162 |
| 2,704,334 | 3/1955 | Brailsford | 310/68 |
| 3,375,384 | 3/1968 | Thees | 310/162 |
| 3,597,915 | 8/1971 | Aizawa | 310/83 |
| 3,657,583 | 4/1972 | Tamaru | 310/40 MM |
| 3,720,864 | 3/1973 | Kolhagen | 310/156 |
| 3,731,125 | 5/1973 | Nikaido | 310/49 |
| 3,818,690 | 6/1974 | Schwarzschild | 310/49 |

*Primary Examiner*—R. Skudy
*Attorney, Agent, or Firm*—Blum, Moscovitz, Friedman & Kaplan

[57] ABSTRACT

A step motor particularly suited for use in electronic timepieces wherein the induced current generated by the stepping of the rotor is utilized to minimize the power consumption thereof. The step motor includes a permanent magnet rotor adapted to be stepped through a specific angle, at least two stator poles surrounding same, and an electromagnetic core coupled to the stator poles for providing at least first and second magnetic orientation to said stator poles in order to step said rotor through the specific angle. Coupled to the electromagnetic core is a circuit for applying driving pulses to the stator pole to effect said orientations thereof, and a second circuit coupled to said first mentioned circuit for terminating each drive pulse applied to said electromagnetic core at a time coincident with completion of the stepping of the rotor through the specific angle.

1 Claim, 3 Drawing Figures

STEP MOTOR FOR ELECTRONIC TIMEPIECE

BACKGROUND OF THE INVENTION

This invention relates to a step motor for use in an electronic timepiece and particularly to the use of induced currents generated in an electromagnetic coil for reducing the power utilized by such motors in stepping the rotor.

A problem encountered in conventional step motors utilized in electronic timepieces is the attenuation of the rotor after stepping same, caused by the driving pulses utilized to step the rotor. Heretofore, such attenuation has been prevented by providing a permanent magnet on the stator, or placing a permanent magnet between the rotor and the stator. The disadvantage of the former was that current pulses continued to be applied until the rotor was attenuated to some extent, the consequence thereof being a long pulse width and hence an increase in the current consumption of the motor. The disadvantage encountered in placing the permanent magnet between the rotor and the stator was the complexity of properly positioning the permanent magnet since the rotary angle through which the rotor is stepped as each pulse is applied thereto is doubled and the magnetic poles of the fixed permanent magnet are predetermined in advance.

SUMMARY OF THE INVENTION

Generally speaking, in accordance with the invention, a step motor particularly suited for use in an electronic timepiece wherein the induced currents are utilized to minimize the power consumed thereby is provided. The step motor includes a permanent magnet rotor adapted to be stepped through a specific angle, at least two stator poles having semicircular recessed portions, said semicircular recessed portions substantially surrounding the rotor at the periphery thereof, and an electromagnetic core magnetically coupled to the stator poles, the electromagnetic core being adapted in response to a drive pulse to generate a first or second magnetic orientation of said stator poles in order to step said rotor through said specific angle for each drive pulse applied thereto. The invention includes first circuit means coupled to the electromagnetic core to apply a drive pulse to the stator pole piece to thereby effect the magnetic orientation thereof and a second circuit means coupled to the first circuit means for terminating said driving pulses applied to said electromagnetic core at a time coincident with the completion of the stepping of the rotor through said specific angle.

Accordingly, it is an object of this invention to provide an improved step motor for use in an electronic timepiece.

Another object of this invention is to provide an improved electronic timepiece step motor wherein induced currents are utilized to minimize the current necessary to step the rotor.

Still another object of this invention is to provide an improved step motor wherein a permanent magnet is not needed to remove the attenuations of said rotor for each step thereof.

Still other objects and advantages of the invention will in part be obvious and will in part be apparent from the specification.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
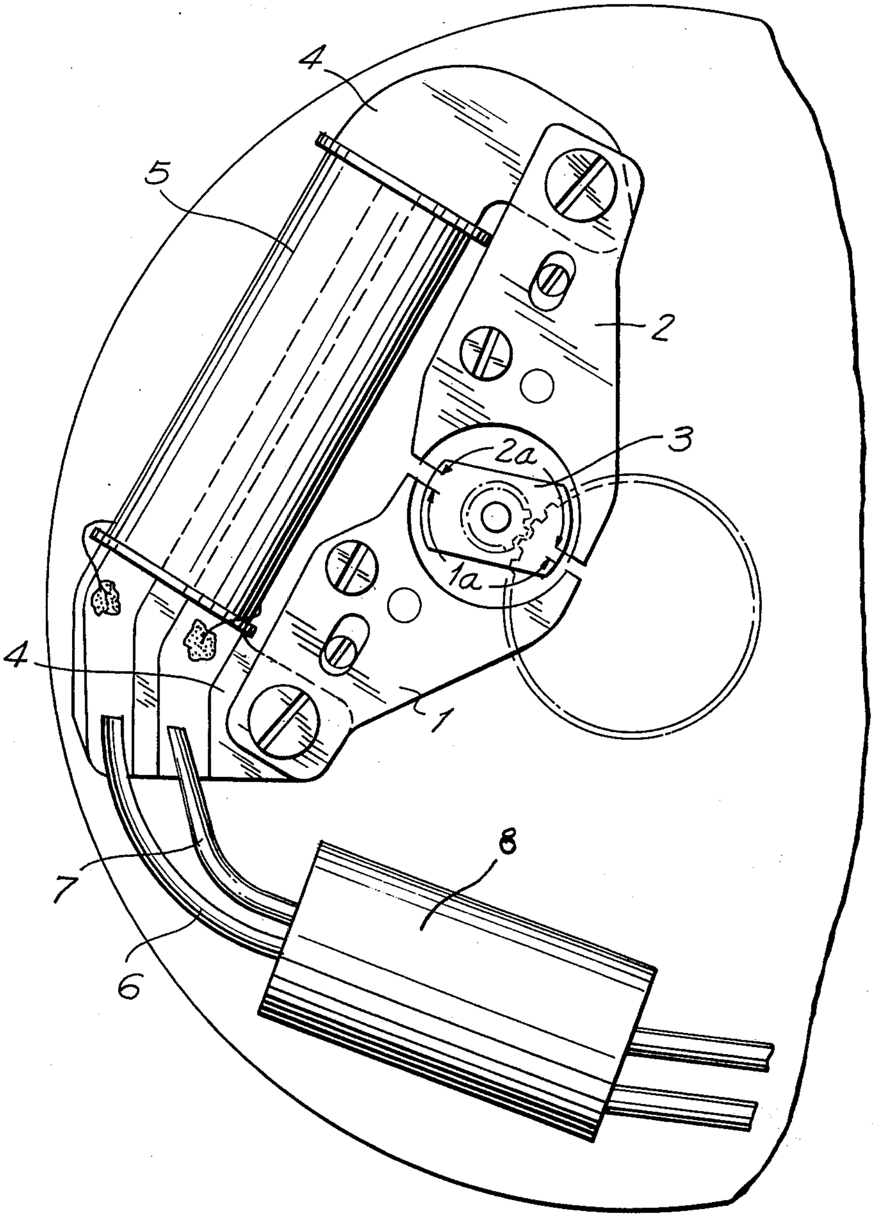
FIG. 1 is a perspective view of an electronic timepiece for use with the instant invention.

Reference is now made to FIG. 1, wherein a quartz crystal electronic timepiece is depicted. The timepiece includes stator poles 1 and 2 peripherally disposed to surround a permanent magnet rotor 3. The stator poles are further connected to respective ends of a coil core 4. Coil core 4 has a coil 5 wrapped therearound in order to generate a magnetic flux field within the coil core 4 when a drive pulse is applied thereto. A driving circuit 8 is coupled to the terminals of the coil 5 by output terminals 6 and 7. Accordingly, a driving pulse current from driving circuit 8 is applied to the coil core 4 through terminal 6 and 7. Because the magnetic flux is generated in the stators 1 and 2, a certain magnetic orientation is thereby effected causing the rotor 3 to be stepped through a certain angle. Accordingly, the rotor is rotated by the interaction caused by the magnetic orientation generated at the ends 1*a* and 2*a* of the stator poles and the polarity of the permanent magnet rotor.

Figure 2:
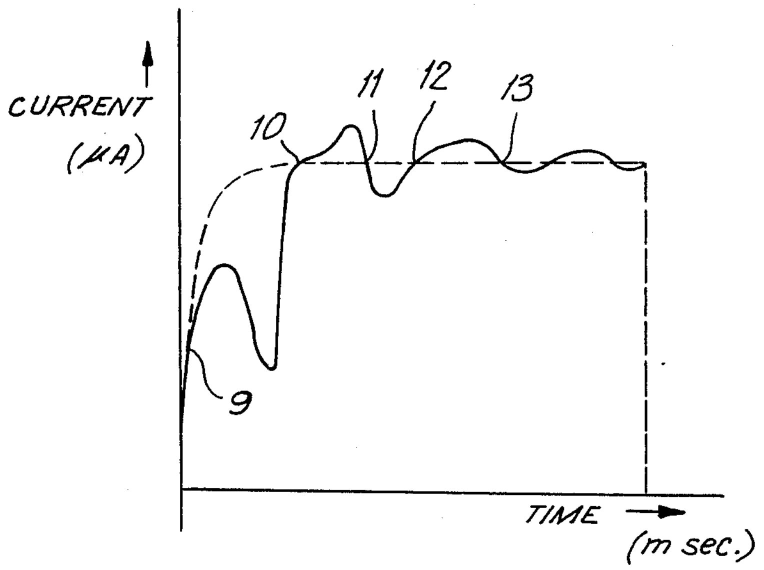
FIG. 2 is a graphic representation of a current drive pulse for a step motor constructed in accordance with the prior art.

Reference is now made to FIG. 2 wherein a graphical representation of the current which flows through the coil 5 in the step motor illustrated in FIG. 1, when the stepping of the rotor is attenuated during the application of driving pulses thereto, is depicted. In operation, the rotor begins to rotate when the current is applied thereto, as noted by the reference numeral 9, and stepped through the necessary angle at the position 10. It is noted that the angle for a two-pole rotor, such as is illustrated in FIG. 1, is 180°, and that the angle through which the rotor is stepped depends on the number of poles of the rotor. Thus, for a six-pole rotor the certain angle through which the rotor is to be stepped is 60° and an eight-pole rotor is 45°, the angle being equivalent to 360° divided by the number of poles of the rotor.

The point 10 is the stable point of the rotor once the driving pulses are cut off. Nevertheless, in conventional stepping motors, the rotor is stepped passed this point and then begins a reverse rotation in the opposite direction at a point 11. Accordingly the rotor attenuates back and forth as indicated by points 12 and 13 until the attenuation of the rotor causes same to come to a standstill at the position of the rotor corresponding to the aforementioned stable point 10. Accordingly, the rotor is stepped between points 9 and 10, is braked at 10 to 11, is reversely accelerated at 11 to 12 and is braked again at 12 to 13. It is noted, that the ideal waveform to effect the stabilized rotary movement of the rotor one step at a time is illustrated by the dotted line in FIG. 2.

Figure 3:
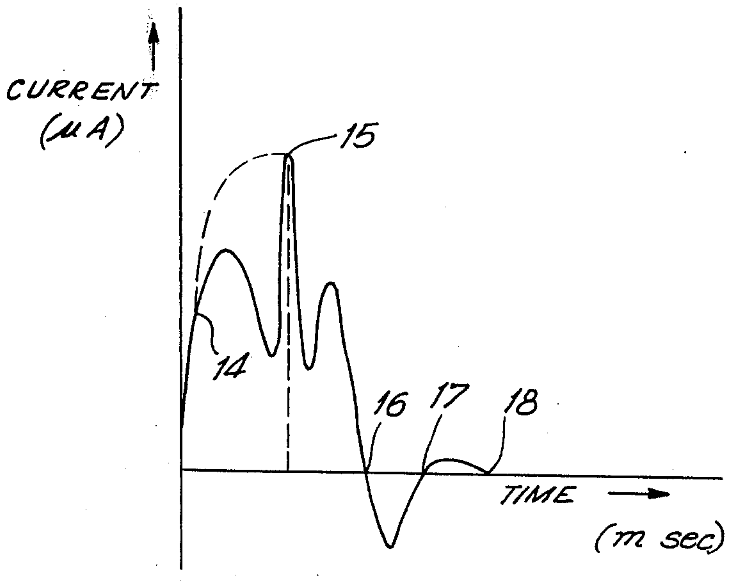
FIG. 3 is a graphic representation of a current drive pulse for a step motor constructed in accordance with the instant invention.

Reference is now made to FIG. 3 wherein a graphical representation of the current waveform generated in the coil in the step motor when same is stepped in accordance with the instant invention is depicted. As is illustrated in FIG. 2, the ideal drive pulse is indicated by dotted lines. The rotor is driven and accelerated between points 14 and 15, the rotor being stepped through the desired angle and reaching such position at 15. Accordingly, if the drive pulse is terminated within the time that it takes to rotate the rotor to the stable point, the currents induced by the subsequent movement of the rotor illustrated by points 15, 16, 17 and 18 in FIG. 3 are induced currents and as will hereinafter be discussed, effect a braking of the movement of the rotor.

It is noted, that due to the inherent characteristics thereof, induced currents effect a braking of the movement of the rotor. Nevertheless, the induced currents in the coil during the generation of pulses do not influence the pulse current enough to change the direction of the current which flows through the coil. Thus, the currents induced after point 15 in FIG. 3, namely, the current that flows through the coil after the drive pulse is cut off, are induced currents, all of which are applied in a direction which aids in brining the movement of the rotor to a halt. Induced current can be expressed in the following:

$$i = \frac{1}{R} \cdot \frac{d\phi}{d\theta} \cdot \frac{d\theta}{dt}$$

wherein $R$ = the coil resistance, $$\frac{d\phi}{d\theta}$$

equals the change in magnetic flux and $$\frac{d\theta}{dt}$$

equals the angular velocity of the rotor. Accordingly, the larger the speed of the rotor, the larger the amount of induced current that will operate as a braking current. Accordingly, if the energy which holds the rotor is large, then a large braking will be necessary, such braking being very effective in providing a stabilized movement of the rotor. Thus in the prior art the attenuation of the rotor effected by the application of pulses, as is indicated in FIG. 2, causes the velocity of the rotor to be reduced when the pulses are not cut off in which case there is no braking effect because the induced currents are so small by comparision with current applied to the coil.

In the instant invention, by short circuiting both ends of the coil by appropriate circuitry once the drive pulse is terminated and terminating of the drive pulse within the time required to rotate the rotor through certain angle, maximizes the use of induced currents in stabilizing the movement of the rotor. As illustrated in FIG. 2, the current of the drive pulse is acting as a brake upon the rotor between points 10 and 11. Nevertheless, because the upper limit of the pulse width continues thereafter, the attenuation which occurs causes excessive power consumption. Accordingly, in the instant invention, the pulse width has an upper limit at the point at which the rotor rotates through the rotary angle which defines the stable position of the rotor. Hence, the upper limit of the pulse width in the instant invention is limited by the time required for the start of the reverse rotation of the rotor while the lower limit of the pulse width is the time required for the rotor to pass near the gap between the stators 1 and 2 illustrated in FIG. 1.

The significance of this pulse width is noted by comparing same with stepping motors wherein a fixed magnet is located within a stator between the rotor and the stator. By utilizing the pulsing arrangement of the instant invention, the rotary angle for one pulse applied to the rotor is half compared with a motor using a fixed magnet resulting in a simplified construction and a reduced number of parts and rendering same particularly suited for use in electronic quartz crystal timepieces.

It is noted that the relating of the stepping of the rotor to the width of the drive pulse applied thereto, requires considering such factors as the inertia of the rotor, the amount of magnetism generated by the flux field in the rotor, the magnetomotive force generated in the coil, the gap between the stator and the rotor, etc. For example, if the magnetomotive force of the coil is 3 to 7 AT, the quantity of magnetism of the rotor is 1600 gauss or less, the inertia of the rotor is 60 mg-mm or less, and the gap between the stator and the rotor is on the order of 50/100 mm or less, a pulse width of 3 to 12 msec will be appropriate for effecting a stabilized stepping of the rotor in accordance with the instant invention.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

What is claimed is:

1. In an electronic timepiece, a step motor having a permanent magnet rotor adapted to be stepped through a specific angle, at least two stator poles having semicircular recessed portions, said recessed portions substantially surrounding said rotor at the periphery thereof, and an electromagnetic core coupled to said stator pole pieces said core including a coil wrapped therearound, said electromagnetic core being adapted in response to each drive pulse applied to said coil to effect first and second magnetic orientations of said stator poles in order to step said rotor through said specific angle, the improvement comprising means coupled to said coil for applying drive pulses thereto to effect said orientations; said drive pulse application means including short circuiting means for terminating said driving pulses applied to said coil at a time not later than the completion of the stepping of the rotor through said specific angle by short circuiting said coil wrapped around said core at a time not later than the terminating of the pulse applied thereto.

* * * * *